GREGG CLAYTON.
Improvement in Apple Pulping Machines.
No. 115,705.   Patented June 6, 1871.
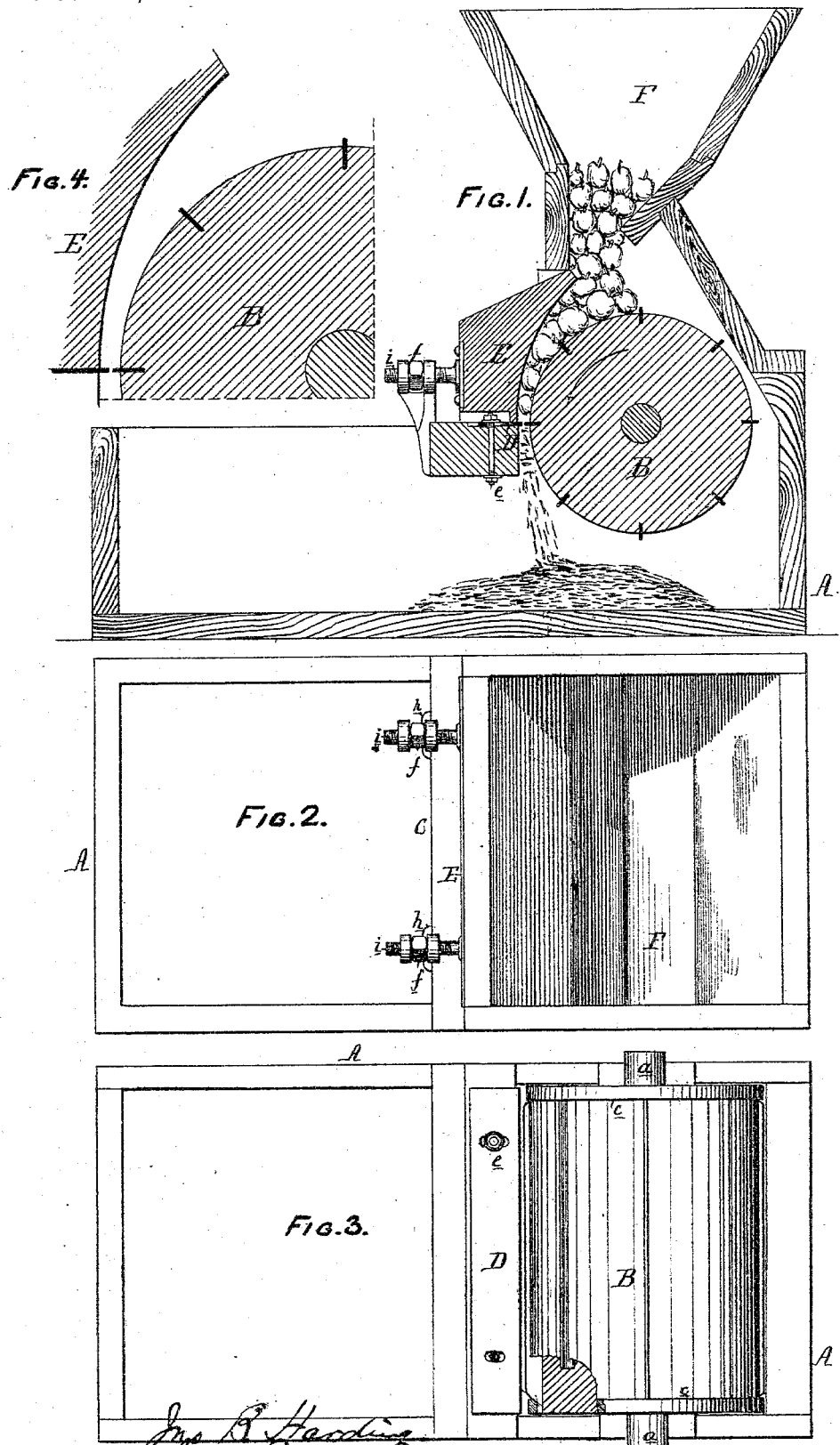

UNITED STATES PATENT OFFICE.

GREGG CLAYTON, OF MARSHALLTON, ASSIGNOR TO HIMSELF AND SAMUEL RINGWALT, OF DOWNINGTOWN, PENNSYLVANIA.

IMPROVEMENT IN APPLE-PULPING MACHINES.

Specification forming part of Letters Patent No. 115,705, dated June 6, 1871.

I, GREGG CLAYTON, of Marshallton, county of Chester, State of Pennsylvania, have invented an Improved Apple-Pulping Machine, of which the following is a specification:

My invention consists of an apple-pulping machine, too fully explained hereafter to need preliminary description; the object of the invention being to pulp apples of different sizes and quality with equal efficiency and rapidity.

Description of the Accompanying Drawing.

Figure 1 is a sectional elevation of my improved apple-pulping machine; Fig. 2, a plan view of the same; Fig. 3, a plan view with the hopper and concave removed; and Fig. 4, an enlarged view of part of Fig. 1.

General Description.

A is a box, on the top of which, near one end, are formed bearings for the reception of the journals $a\ a$ of a wooden cylinder, B. Into grooves in the latter are fitted blades which project a short distance from the surface of the cylinder, the blades being properly secured in the present instance by hoops or bands $c\ c$. A transverse bar, C, is secured at its opposite ends to the sides of the box A, its upper surface being in a horizontal plane passing through the center of the cylinder B. A blade, D, is let into this bar, and is so secured by bolts $e$ that it can be adjusted from or toward the cylinder, and fastened after adjustment. A concave, E, rests upon the beam C, and is adjustable toward or from the cylinder B by any suitable mechanism—in the present instance by nuts $f\ f$—situated between collars on a bracket, $h$, and adapted to screws $i\ i$ secured to the concave. Directly above the cylinder B, and resting on the sides and end of the vessel A, is a hopper, F, for the reception of the apples, it being contracted at and near the bottom in order to limit the direct supply of the apples to the space between the cylinder and concave.

As the cylinder revolves in the direction of the arrow, Fig. 1, pulp will be scraped from the apples by blades $b$, and projected into the rear part of the box A, from which it may be removed and placed in bags, to be subjected to the action of a cider-press, as usual.

By the above-described machine I am enabled to pulp apples of different sizes and qualities with equal facility; thus, if the apples are soft and small, the space between the concave and the blades of the cylinder should be narrow, and the blade D so adjusted as to retain the apples while being pulped by the action of the revolving blades. For larger apples the space between the concave and the cylinder should be increased, the blade D being adjusted independently of the concave, in accordance with the quality of the apples and the desired degree of fineness of the pulp.

Claim.

The combination of the cylinder B and its blades with the adjustable concave E, and the blade D rendered adjustable independently of the concave, all substantially as described.

In testimony whereof I have signed my name to this specification in the presence of two subscribing witnesses.

GREGG CLAYTON.

Witnesses:
JOHN WEBSTER,
HETTY D. WEBSTER.